United States Patent
Searcy et al.

(10) Patent No.: US 10,069,589 B2
(45) Date of Patent: *Sep. 4, 2018

(54) METHOD AND APPARATUS FOR INCREASING A TRANSMISSION PERFORMANCE OF A HYBRID WAVELENGTH DIVISION MULTIPLEXING SYSTEM

(71) Applicant: ADVA Optical Networking SE, Martinsried / Munich (DE)

(72) Inventors: Steven Searcy, Johns Creek, GA (US); Sorin Tibuleac, Johns Creek, GA (US)

(73) Assignee: ADVA OPTICAL NETWORKING SE, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/828,676

(22) Filed: Aug. 18, 2015

(65) Prior Publication Data

US 2015/0358108 A1 Dec. 10, 2015

Related U.S. Application Data

(63) Continuation of application No. 13/712,765, filed on Dec. 12, 2012, now Pat. No. 9,166,722.

(51) Int. Cl.
| | |
|---|---|
| *H04J 14/02* | (2006.01) |
| *H04B 10/516* | (2013.01) |
| *H04B 10/2557* | (2013.01) |
| *H04B 10/077* | (2013.01) |
| *H04B 10/079* | (2013.01) |

(52) U.S. Cl.
CPC .......... *H04J 14/02* (2013.01); *H04B 10/0779* (2013.01); *H04B 10/0799* (2013.01); *H04B 10/2557* (2013.01); *H04B 10/5161* (2013.01); *H04J 14/0275* (2013.01)

(58) Field of Classification Search
CPC .............. H04B 10/505; H04B 10/5051; H04B 10/5053; H04B 10/5055; H04B 10/50572; H04B 10/50575; H04B 10/58; H04B 10/516; H04B 10/548; H04B 10/2563; H04B 10/50593; H04B 10/50597; H04B 10/2557; H04B 10/5161; H04B 10/0779; H04B 10/0799; G02F 2001/212; H04J 14/02; H04J 14/0275
USPC ....... 398/85, 186, 188, 135–139, 30–34, 79, 398/66–68, 185, 192
See application file for complete search history.

(56) References Cited

U.S. PATENT DOCUMENTS

| | | | |
|---|---|---|---|
| 6,124,960 A * | 9/2000 | Garthe | H04B 10/25137 398/1 |
| 7,266,306 B1 * | 9/2007 | Harley | H04B 10/505 398/182 |

(Continued)

*Primary Examiner* — Hibret Woldekidan
(74) *Attorney, Agent, or Firm* — Maginot, Moore & Beck, LLP

(57) ABSTRACT

A hybrid wavelength division multiplexing system wherein one or more intensity modulated signals generated by optical amplitude modulators are co-propagated with one or more phase modulated signals generated by optical phase modulators, wherein a drive voltage of said optical amplitude modulator is adapted to reduce an extinction ratio of the intensity modulated signal to minimize a cross-phase modulation impact on the co-propagating phase modulated signals.

23 Claims, 7 Drawing Sheets

(56) References Cited

U.S. PATENT DOCUMENTS

| | | | |
|---|---|---|---|
| 7,394,993 B2 * | 7/2008 | Sekiya | H04B 10/25133 398/147 |
| 7,421,204 B2 * | 9/2008 | Jennen | H04B 10/505 398/189 |
| 8,059,970 B2 * | 11/2011 | Harley | H04B 10/5053 398/182 |
| 8,620,156 B2 * | 12/2013 | Portier | H04B 10/035 398/38 |
| 2002/0039217 A1 * | 4/2002 | Saunders | H04B 10/25137 398/147 |
| 2007/0041006 A1 * | 2/2007 | Abbott | 356/73.1 |
| 2008/0212979 A1 * | 9/2008 | Ota | H04B 10/505 398/183 |
| 2010/0178053 A1 * | 7/2010 | Sagawa | H04B 10/272 398/35 |
| 2010/0260505 A1 * | 10/2010 | Dahan | H04B 10/505 398/183 |
| 2011/0081151 A1 * | 4/2011 | Yu | H04B 10/532 398/79 |
| 2012/0134669 A1 * | 5/2012 | Xu | H04B 10/272 398/38 |
| 2012/0170928 A1 * | 7/2012 | Tanaka | H04B 10/2557 398/28 |

* cited by examiner

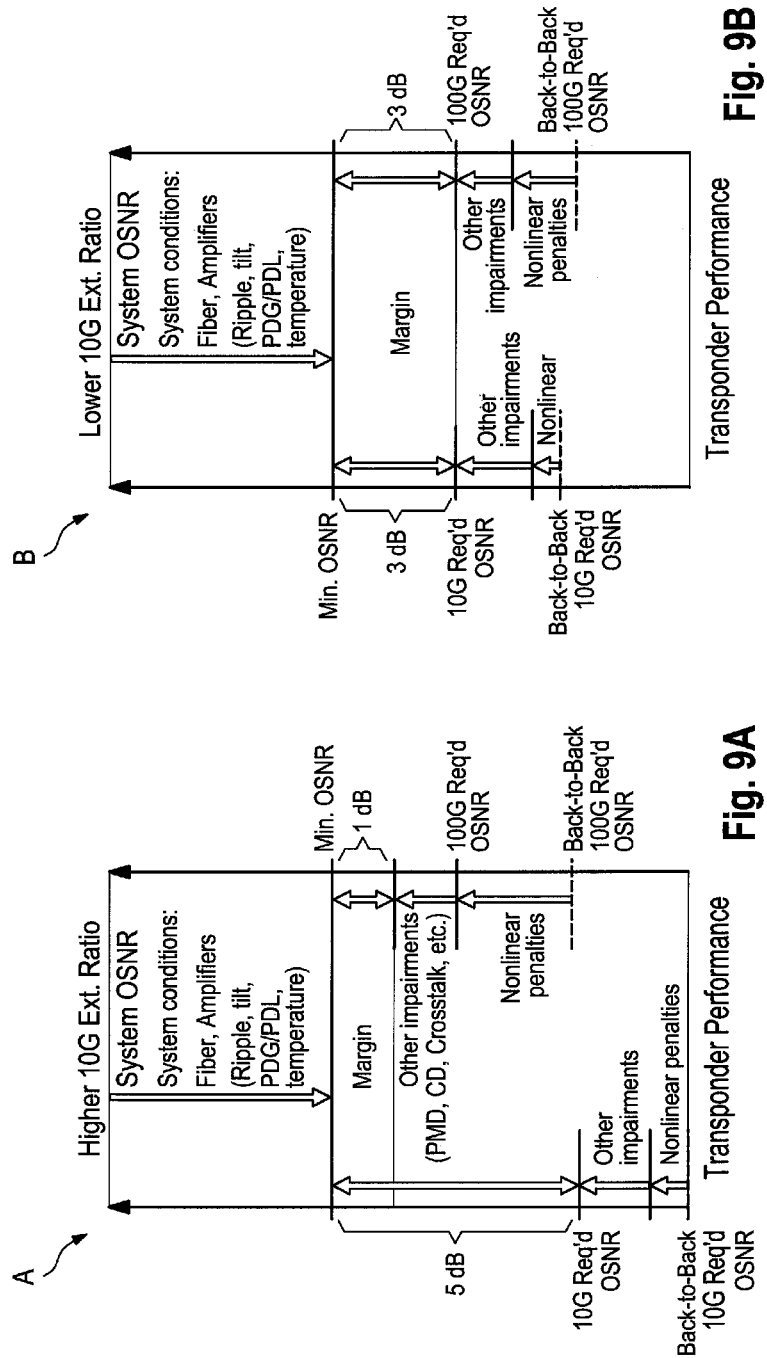

METHOD AND APPARATUS FOR INCREASING A TRANSMISSION PERFORMANCE OF A HYBRID WAVELENGTH DIVISION MULTIPLEXING SYSTEM

REFERENCE TO RELATED APPLICATION AND PRIORITY CLAIM

This application is a continuation of and claims priority to co-pending application Ser. No. 13/712,765, filed on Dec. 12, 2012, the entire contents of which are incorporated herein by reference.

BACKGROUND

The invention relates to a method and apparatus for increasing a transmission performance of a hybrid wavelength division multiplexing system, and in particular to a method and apparatus for reducing cross-phase modulation in hybrid QPSK-OOK dense wavelength division multiplexing systems (DWDM).

In optical networks optical signals are transported via optical fibers from an optical transmitter to an optical receiver. In many optical networks it is necessary that optical signals of different types do co-propagate through the same optical fiber. In wavelength division multiplexing systems it is possible that optical amplitude modulated signals are travelling along the same fiber as phase modulated signals. For example, an On/off keying signal can co-propagate with a PDM (Polarization Division Multiplexing)-QPSK-(Quadrature Phase Shift keying) signal. Furthermore, optical signals propagating on the same fiber can have different modulation formats. This kind of a mixed rate, mixed format optical network can be referred to as a hybrid system.

FIG. 1 shows a spectrum of an optical signal travelling along a fiber of the optical network wherein the signal is composed of a phase modulated signal and an amplitude or intensity modulated signal. The spectrum of FIG. 1 depicts a 100 Gb/sec PDM-QPSK channel with a frequency of 193.4 Terahertz (THz) surrounded by 10 Gb/sec OOK channels in a standard ITU 50 GHz grid. The 100 Gb/sec PDM-QPSK signal is a phase modulated signal generated by a nested Mach-Zehnder modulator also known as quadrature modulator whereas the 10 Gb/sec OOK signal forms an intensity modulated signal generated by an optical amplitude modulator. For the phase modulated signal such as the 100 G PDM-QPSK signal the worst case cross-phase modulation XPM occurs when the neighbouring channels are intensity modulated such as the amplitude modulated 10 G OOK signals co-propagating through the same optical fiber. This type of legacy system employs an inline optical dispersion compensation using a dispersion compensation fiber DCF which is necessary for the 10 G OOK signals and usually cannot be removed from the optical network without interruption of traffic signals. The inline dispersion compensation achieved by means of the dispersion compensation fiber DCF further increases the cross-phase modulation XPM by removing or reducing a walk-off between channels due to chromatic dispersion. Cross-phase modulation XPM is a non-linear optical effect where one wavelength of light affects the phase of another wavelength of light through the so-called optical Kerr effect. This cross-phase modulation has the disadvantage that it can lead to interchannel crosstalk in wavelength division multiplexing systems. It further can produce amplitude and timing jitter.

To reduce cross-phase modulation XPM different reduction mechanisms have been proposed. A conventional way to reduce cross-phase modulation is to reduce the power of the 10 G channels in comparison to the power of the 100 G channels. This, however, requires a complex software algorithm to communicate with intermediate nodes of the network and a control power per channel at all amplifiers and ROADM (Reconfigurable Optical Add-drop Multiplexer) nodes within the optical network.

Further, it has been proposed to insert channel separation devices such as ROADM, interleavers or multiplexing/demultiplexing devices to demultiplex WDM channels and transmit them through different paths within the same node of the network with adequate path length differences to introduce a differential delay between the channels. Another conventional mechanism is the insertion of a fiber Bragg-grating DCM instead of the dispersion fiber based DCMs to increase the walk-off between the 10 Gbit/sec On/Off keying (OOK) amplitude modulated signal and the 100 Gbit/sec PDM-QPSK channels. Further, it was proposed to insert additional devices to create PMD. All these proposals have the disadvantage that they depend on specific devices being present in the network or being added into the system for the sole purpose of reducing cross-phase modulation XPM. Moreover, the insertion of additional devices to create PMD does reduce a transmission distance of the 10 G OOK channels. Another disadvantage of these conventional mechanisms is that they do not allow an in-service upgrade of 10 G to 100 G channels.

Accordingly, it is an object of the present invention to provide a method and apparatus for increasing a transmission performance of a hybrid wavelength division multiplexing system not having the above-mentioned disadvantages of the conventional mechanisms.

SUMMARY OF THE INVENTION

The invention relates to a hybrid wavelength division multiplexing system wherein one or more intensity modulated signals are co-propagated with one or more phase modulated signals, wherein an extinction ratio of the intensity modulated signal is reduced to minimize a cross-phase modulation impact on the co-propagating phase modulated signals.

In a possible embodiment of the hybrid wavelength division multiplexing system according to the present invention the intensity modulated signal is generated by an optical amplitude modulator which can be a Mach-Zehnder modulator receiving an adapted drive voltage to modulate the intensity of an optical signal generated by a light source.

In a still further possible embodiment of the hybrid wavelength division multiplexing system according to the present invention said optical amplitude modulator is integrated in a transmitter of a transceiver within said hybrid wavelength division multiplexing system.

In a further possible embodiment of the hybrid wavelength division multiplexing system according to the present invention the drive voltage is output by a driver of the transmitter in response to a data signal received from a data source connected to said transceiver.

In a further possible embodiment of the hybrid wavelength division multiplexing system according to the present invention the drive voltage is preconfigured.

In a still further possible alternative embodiment of the hybrid wavelength division multiplexing system according to the present invention the drive voltage is set dynamically in response to information data obtained by a receiver of a remote far-end transceiver within said hybrid wavelength division multiplexing system and communicated to said transmitter of said transceiver within said hybrid wavelength division multiplexing system via an optical supervisory channel OSC.

In a possible implementation of the hybrid wavelength division multiplexing system the optical amplitude modulator is adapted to generate a 10 Gbit/sec On/Off keying (OOK) intensity modulated signal.

In a possible implementation of the hybrid wavelength division multiplexing system according to the present invention the co-propagated phase modulated signal is a 100 Gbit/sec PDM-QPSK signal.

In a possible embodiment of the hybrid wavelength division multiplexing system the hybrid wavelength division multiplexing system is a dense WDM system (DWDM).

In a possible embodiment of the hybrid wavelength division multiplexing system according to the present invention the transceiver is connected to a multiplexer which is adapted to multiplex the intensity modulated signal and other intensity or phase modulated signals on the same optical fiber of the hybrid wavelength division multiplexing system.

According to a further second aspect of the present invention a transmitter for a hybrid wavelength division multiplexing system is provided.

In a possible embodiment the transmitter for a hybrid wavelength division multiplexing system comprises an optical amplitude modulator receiving a drive voltage and being adapted to reduce an extinction ratio of an intensity modulated signal generated by said optical amplitude modulator in response to the drive voltage to minimize a cross-phase modulation impact of the intensity modulated signal generated by said optical amplitude modulator on phase modulated signals co-propagated in said hybrid wavelength division multiplexing system along with the generated intensity modulated signal.

In a possible embodiment of the transmitter according to the second aspect of the present invention the optical amplitude modulator is a Mach-Zehnder modulator.

According to a further third aspect of the present invention a transceiver for a hybrid wavelength division multiplexing system is provided.

A transceiver for a hybrid wavelength division multiplexing system can comprise a near-end transmitter according to the second aspect of the present invention adapted to transmit an intensity modulated signal to a far-end receiver of a remote transceiver within said hybrid wavelength division multiplexing system, wherein the transceiver further comprises a receiver adapted to receive an intensity modulated signal from a far-end transmitter of said remote transceiver within said hybrid wavelength division multiplexing system.

In a possible embodiment of the transceiver according to the third aspect of the present invention the transceiver comprises a signal evaluation unit adapted to derive information data of a signal transmission channel through which the intensity modulated signal has been transported from the far-end transmitter of the remote transceiver to the near-end transmitter of said transceiver.

In a possible embodiment the signal evaluation unit is adapted to evaluate the quality of a signal transmitted through said signal transmission channel by using at least one performance metric comprising a bit error rate, BER, a Q-factor and/or a signal to noise ratio SNR.

In a possible embodiment of the transceiver according to the third aspect of the present invention the drive voltage of said optical amplitude modulator of said near-end transmitter within the transceiver is adapted by a drive voltage adaption unit of said transceiver depending on information data derived by said signal evaluation unit of said transceiver.

The invention further provides according to a fourth aspect a method for increasing a transmission performance of a hybrid wavelength division multiplexing system.

According to the fourth aspect a method for increasing a transmission performance of a hybrid wavelength division multiplexing system is provided where one or more intensity modulated signals are co-propagated with one or more phase modulated signals, wherein an extinction ratio of the intensity modulated signal is reduced to minimize a cross-phase modulation impact on the co-propagating phase modulated signals.

According to a possible embodiment of the method according to the fourth aspect of the present invention a drive voltage of an optical amplitude modulator of the near-end transmitter is modified to reduce the extinction ratio of the intensity modulated signal generated by said optical amplitude modulator.

According to a possible embodiment of the method according to the fourth aspect of the present invention the drive voltage of the optical amplitude modulator is preconfigured.

In a possible alternative embodiment of the method according to the fourth aspect of the present invention the drive voltage of the optical amplitude modulator is set dynamically in response to information data obtained by a far-end receiver of a remote transceiver and communicated to the near-end transmitter comprising said optical amplitude modulator via an optical supervisory channel.

BRIEF DESCRIPTION OF THE FIGURES

In the following possible embodiments of the apparatus and method for increasing a transmission performance of a hybrid wavelength division multiplexing system are described with reference to the enclosed figures in more detail.

FIG. 9A, 9B show diagrams for illustrating the operation of the embodiment shown in FIG. 8.

DETAILED DESCRIPTION OF EMBODIMENTS

Figure 1:
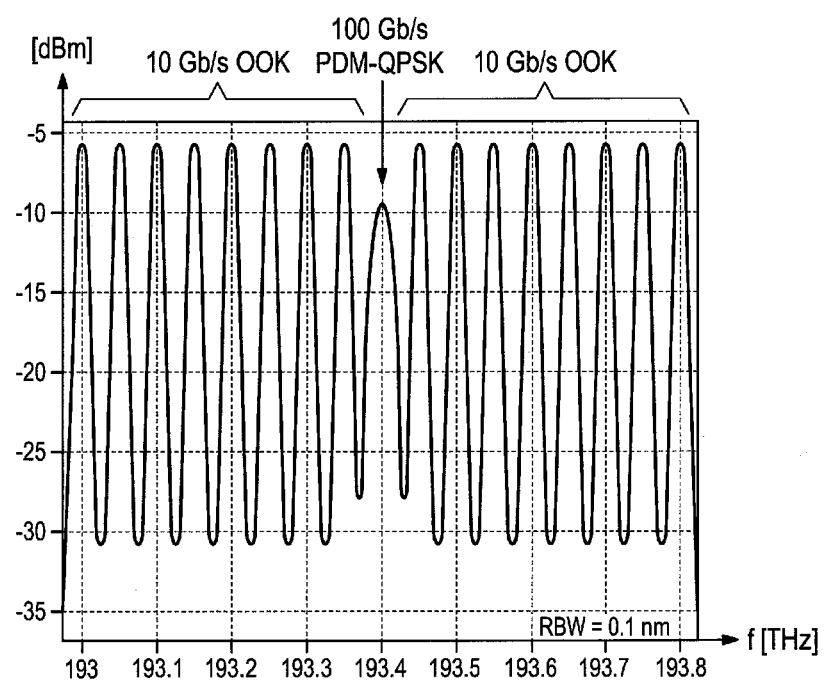
FIG. 1 shows a signal spectrum for illustrating a problem underlying the present invention.
Figure 2:
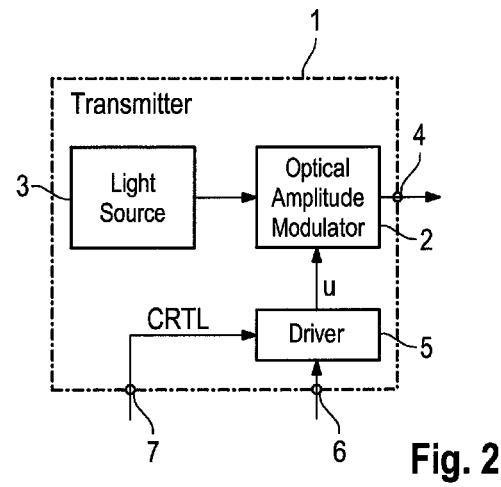
FIG. 2 shows a block diagram of a possible embodiment of a transmitter within the hybrid wavelength division multiplexing system according to the present invention.

FIG. 2 shows a possible embodiment of a transmitter 1 within a hybrid wavelength division multiplexing system HWDM according to a first aspect of the present invention. As can be seen in FIG. 2 the transmitter 1 comprises at least one optical amplitude modulator 2 connected to a light source 3. The light source 3 is in a possible embodiment a laser light source applying a laser signal to the optical amplitude modulator 2 which modulates the intensity of the optical signal generated by the light source 3. A modulated optical transmission signal is output at a signal output 4 of the transmitter 1 and can be transported in an optical fiber of the hybrid wavelength division multiplexing system HWDM within an optical network. The optical amplitude modulator 2 generates an intensity modulated signal. This generated intensity modulated signal can be co-propagated with one or more intensity or phase modulated signals on the same optical fiber. The phase modulated signals can be generated by optical phase modulators 8. It is possible that the phase modulated signals are generated by optical phase modulators of different entities within the optical network.

The optical amplitude modulator 2 of the transmitter 1 is supplied with a drive voltage U provided by a driver 5 of the transmitter 1. The driver 5 can receive at a data input 6 of the transmitter 1 a data signal and can generate a corresponding drive voltage U for the optical amplitude modulator 2. In a possible implementation the driver 5 can further receive a control signal received by a control input 7 of the transmitter 1. The drive voltage U applied to the optical amplitude modulator 2 is adapted to reduce an extinction ratio of the intensity modulated signal generated by the optical amplitude modulator 2 to minimize a cross-phase modulation XPM impact on the co-propagating phase modulated signals.

In a possible embodiment the optical amplitude modulator 2 is formed by a Mach-Zehnder modulator MZM receiving the adapted drive voltage U to modulate the intensity of the optical signal generated by the light source 3. The Mach-Zehnder modulator MZM is an interferometer, i.e. an optical device which utilizes an effect of interference. The input light beam is split into two separate beams by means of a beam splitter. The splitted optical signal is sent down to different optical paths within the Mach-Zehnder modulator MZM. The signal paths are equipped with a phase modulator where an electrical field is applied to the respective signal path formed by a material having a refractive index which can be changed by applying an external voltage, for instance via a coated electrode. The phase modulation in each path is a function of the wavelength, the length of the electrode and the change of the effective refractive index. Behind the electrode the optical signals of the two signal paths are recombined so that there is an interference between the optical waves. Depending on the applied electrical voltages the signal interference can vary from destructive to constructive and thereby producing an intensity modulation of the signal.

Figure 4:
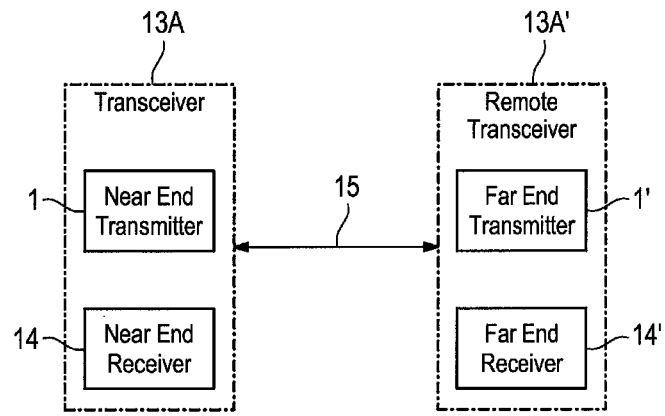
FIG. 4 shows a block diagram for illustrating a transceiver and a remote transceiver within a hybrid wavelength division multiplexing system according to the present invention.

The transmitter 1 of the hybrid wavelength division multiplexing system HWDM can be integrated in a transceiver 13 comprising at least one transmitter 1 and a corresponding receiver 14 for receiving an optical signal as shown in FIG. 4. The intensity modulated signal generated by the optical amplitude modulator 2 can be in a possible embodiment a 10 Gbit/sec On/Off keying amplitude modulated signal. On/Off keying OOK is a form of amplitude shift keying ASK modulation that represents the digital data as the presence or absence of a carrier wave. In a possible implementation of the hybrid wavelength division multiplexing system the intensity modulated signal such as the 10 G OOK modulated signal can be co-propagated with one or more phase modulated signals, in particular a 100 Gbit/sec PDM-QPSK signal. To maximize the performance of the hybrid wavelength division multiplexing system HDWM comprising intensity and phase modulated signals the performance of both the intensity modulated signals as well as the phase modulated signals must be considered. The 10 G OOK amplitude modulated signal typically has a lower required OSNR (Optical Signal To Noise Ratio) relative to a phase modulated 100 G QPSK signal wherein the difference in OSNR is typically 2 to 3 dB. In terms of signal non-linearity the non-linear tolerance of a 100 G QPSK phase modulated signal surrounded by a 10 G OOK intensity modulated signal is the limiting factor since the non-linear threshold NLT for the 100 G QPSK phase modulated signal surrounded by 10 G amplitude modulated signal is lower than the non-linear threshold for the 10 G channels. The non-linear threshold NLT is the optical power of the signal launched into every fiber span which corresponds to a given increase in the bit error rate BER, or in the OSNR required at the receiver, for example a 1 dB increase in required OSN for the signal BER. Thus, the OOK intensity modulated signals are more robust than the phase modulated QPSK signals in terms of absolute required optical signal to noise ratio OSNR as well as non-linear tolerance. With the apparatus and method according to the present invention the non-linear tolerance of the phase modulated QPSK signal is improved even at the cost of a degradation of the intensity modulated OOK signal performance to improve the overall system margin of the hybrid wavelength division multiplexing system HWDM.

With the apparatus and method according to the present invention the drive voltage U of the optical amplitude modulator 2 within the hybrid wavelength division multiplexing system HWDM is adjusted in order to reduce an extinction ratio of the intensity modulated OOK signals. This reduces an amplitude of the intensity fluctuations of the intensity modulated OOK signals which in turn reduces the cross-phase modulation XPM impact and non-linear penalty on the QPSK phase modulated signal. The reduction of the extinction ratio of the intensity modulated 10 G OOK signal does improve, i.e. increase, the non-linear threshold NLT of the 100 G phase modulated QPSK signal wherein the required optical signal to noise ratio, OSNR, of the intensity or modulated 10 G signal is also increased. However, since the 10 G intensity modulated signals do have a larger starting OSNR margin it is possible that they are degraded by some amount before the OSNR margin of the entire hybrid wavelength division multiplexing system is affected, since the phase modulated QPSK signal is the limiting factor for the system margin. The OSNR margin is the difference between the actual OSNR of the signals at the optical link i.e. after propagating through a sequence of fiber spans amplifies and other WDM components and the OSNR required by the receiver for a given BER. Although the performance for the 10 G intensity modulated signal is somewhat degraded by the reduced extinction ratio the total system margin of the hybrid wavelength division multiplexing system HWDM is effectively increased since the performance relating to the phase modulated QPSK signal is improved. This trade-off is illustrated in the diagrams of FIGS. 6A, 6B.

Figure 6:
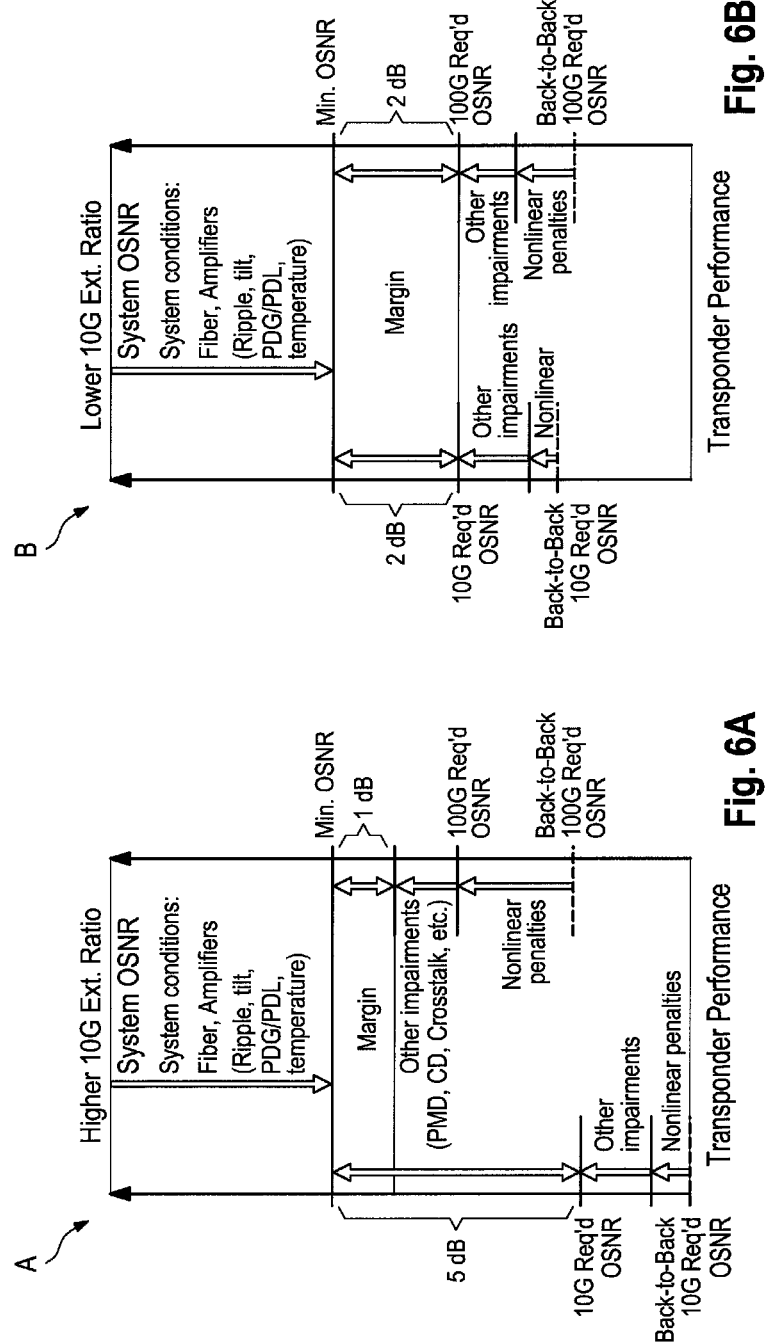
FIGS. 6A, 6B show diagrams for illustrating the operation of a transmitter within a hybrid wavelength division multiplexing system in comparison to a conventional system.

FIGS. 6A, 6B illustrate the optical signal to noise ratio OSNR for a 10 G intensity modulated signal and a co-propagating 100 G phase modulated signal. FIG. 6A shows a situation for a conventional arrangement whereas FIG. 6B shows a situation within a hybrid wavelength division multiplexing system HWDM according to the present invention. In the system according to the present invention a drive voltage U of the optical intensity modulated signal is adapted to reduce an extinction ratio of the intensity modulated signal such as a 10 G OOK signal. The minimum optical signal to noise ratio OSNR forms a limit for a given optical link. As can be seen in FIG. 6A the margin of the 10 G intensity modulated signal in a conventional system is significantly higher than the margin for the 100 G phase modulated signal.

As can be seen in FIG. 6B the margin of the 10 G intensity modulated signal is reduced in a hybrid wavelength division multiplexing system HWDM where at the same time the margin of the 100 G phase modulated signal co-propagating through the same optical system is increased. If, for example, the overall margin of the 10 G intensity modulated signal is 5 dB and the OSNR margin of the 100 G phase modulated signal is 1 dB, the overall margin within the hybrid wavelength division multiplexing system can be for example for both types of signals 2 dB as shown in FIG. 6B. Accordingly, the margin of the phase modulated 100 G signal is increased at the cost of the margin of the intensity modulated signal. This is achieved by reducing the extinction ratio of the intensity modulated signal to minimize the cross-phase modulation, XPM, impact on the co-propagating phase modulated signals.

In the hybrid wavelength division multiplexing system HWDM according to the first aspect of the present invention the extinction of the intensity modulated signal is reduced by changing the amplitude of the drive voltage U supplied by the driver 5 to the optical amplitude modulator 2 which can be formed by a Mach-Zehnder modulator MZM.

Figure 5:
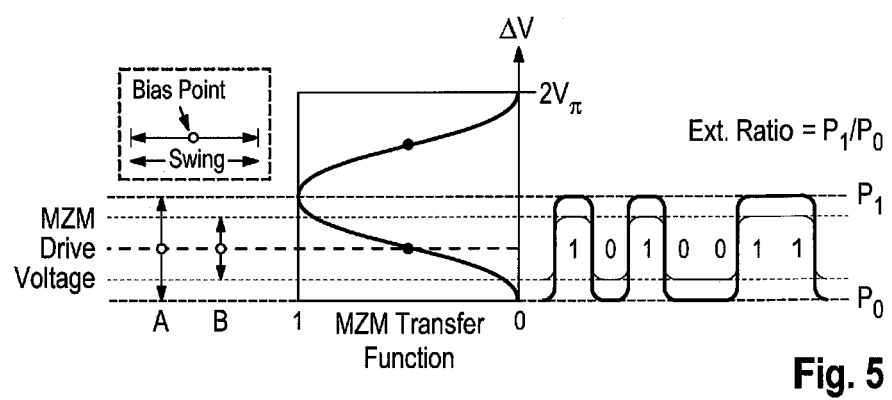
FIG. 5 shows a signal diagram for illustrating the operation of a transmitter within a hybrid wavelength division multiplexing system according to the present invention.

FIG. 5 shows a Mach-Zehnder MZ transfer characteristic as well as an extinction ratio impact of modifying the drive voltage U applied to the optical amplitude modulator 2. The diagram illustrates a structure of a 10 G transmitter which receives the proposed modulator drive voltage U modified to reduce the extinction ratio. In scenario A the drive voltage U provides a full swing around a bias point of the MZM transfer function so that the extinction ratio (extinction ratio=P1:P0) is high. In scenario B the drive voltage U around the bias point of the MZM transfer function has a reduced amplitude or swing so that the extinction ratio of the intensity modulated signal is reduced. By reduction of the extinction ratio the intensity modulated signal such as the 10 G OOK signal has a lower cross-phase modulation XPM impact on a co-propagating phase modulated signal such as the 100 G QPSK signal.

With the method and apparatus according to the present invention the extinction ratio of the On/Off keyed OOK modulated signals which forms the main modulation format used for 10 Gb/sec channels is reduced. This is achieved with different voltages applied to the optical intensity modulator than previously used. The voltage settings in a conventional system used for 10 G modulators are adapted to maximize the extinction ratio of the signals which in turn maximizes the transmission distance of the amplitude or intensity modulated signals. However, the highest extinction ratio also produces the highest degradation on the co-propagating QPSK modulated 100 Gb/sec signals due to the non-linear interaction between these channels, i.e. cross-phase modulation XPM. The maximum transmission distance on 10 Gb/sec channels corresponding to the highest extinction ratio cannot be fully utilized, if the maximum transmission distance of the 100 Gb/sec channels is the limiting factor of the system. Accordingly, with the hybrid wavelength division multiplexing system HWDM according to the present invention a controlled degradation in the extinction ratio of the 10 Gb/sec intensity modulated signals does provide an optimum transmission performance of the combined 100 G/10 G hybrid system. With the method and apparatus according to the present invention the non-linear interaction between the 10 Gb/s intensity modulated signals and the 100 Gb/sec phase modulated signals is reduced to improve the transmission distance of the critical 100 Gb channels on the hybrid WDM system with the co-propagating 10 Gb/s channels. With the method according to the present invention the cross-phase modulation XPM on the 10 Gb/s QPSK phase modulated signals is reduced by reducing the extinction ratio of the 10 Gb/sec OOK intensity modulated signals. This allows the 100 G channels to propagate for longer distances without a need for optoelectronic regeneration within the hybrid wavelength division multiplexing system HWDM.

In a possible implementation of the hybrid wavelength division multiplexing system HWDM a drive voltage, i.e. the maximum drive voltage swing $\Delta V$, is preconfigured and can be stored in a memory of the transmitter 1. In an alternative implementation the drive voltage, i.e. drive voltage swing $\Delta V$ for the optical amplitude modulator 2 is set dynamically in response to information data obtained by a receiver. The receiver can be implemented in a remote transceiver within said hybrid wavelength division multiplexing system HWDM and transmits the information data via a communication channel to said transmitter 1 shown in FIG. 2. The information data can be communicated to the transmitter 1 in a possible embodiment via an optical supervisory channel OSC. The drive voltages applied to the optical amplitude modulator 2 represent an optimum trade-off between the 10 G and 100 G transmission performance and can be determined through several tests which can be implemented in the design of the transmitter 1 as fixed preset values. In this embodiment the drive voltage is preconfigured. In a possible embodiment these values can be dependent on a specific design of the 10 G and 100 G transceiver modules.

In an alternative implementation a further performance optimization and increase flexibility is obtained, for instance, by means of an implemented algorithm which sets the voltages on the optical amplitude modulator 2 based on information data obtained by the far-end receiver and communicated to the near-end transmitter 1 via the optical supervisory channel OSC. This embodiment allows changes in the hardware design of the 10 G or 100 G transponders which potentially can yield different optimum modulator voltages.

In a possible embodiment the hybrid wavelength division multiplexing system HWDM according to the first aspect of the present invention can be formed by a dense wavelength division multiplexing system DWDM. In the wavelength division multiplexing system a number of optical carrier signals is multiplexed onto a single optical fiber by using different wavelengths or colours of laser light. The system enables a bidirectional communication over a single strand or pair of fibers as well as a multiplication of data transmission capacity. The wavelength division multiplexing DWDM system uses the same transmission window as a conventional wavelength division multiplexing system but has a denser channel spacing. The number of channels can vary. A typical DWDM system can comprise 40 channels with a 100 GHz spacing or 80 channels with a 50 GHz spacing. Advanced DWDM systems can only have a 12.5 GHz spacing, sometimes also called ultradense WDM.

The method according to the present invention can be applied to other combinations of intensity and phase modulated signals copropagating through the same optical link, for instance 10 GB/s OOK and 40 GB/s QPSK or 10 GB/s OOK and 200 GB/s PDM-16QAM.

The optical supervisory channel OSC can use an additional wavelength usually outside the conventional signal band. The optical supervisory channel OSC can carry information about the multi-wavelength optical signal as well as remote conditions at a remote receiver or terminal. It can also be used for remote software upgrades and user network management information.

The hybrid DWDM system can also include pluggable and software tunable transceiver modules capable of operating on 40 or 80 or even larger number of channels. For instance the system can support 96 channels in the C-band alone. The L-band can also carry an equal number of channels. The use of reconfigurable optical add-drop multiplexers ROADM does allow for the dropping and adding of certain wavelength channels.

With the method according to the present invention an extinction ratio of an intensity modulated signal is reduced to minimize a cross-phase modulation impact on co-propagating phase modulated signals. This method is provided to increase a transmission performance of the hybrid wavelength division multiplexing system where an intensity modulated signal is co-propagated with one or more phase modulated signals. The method can be performed by a transmitter 1 as shown in FIG. 2. The method can also be performed by different entities within the optical network.

Figure 3:
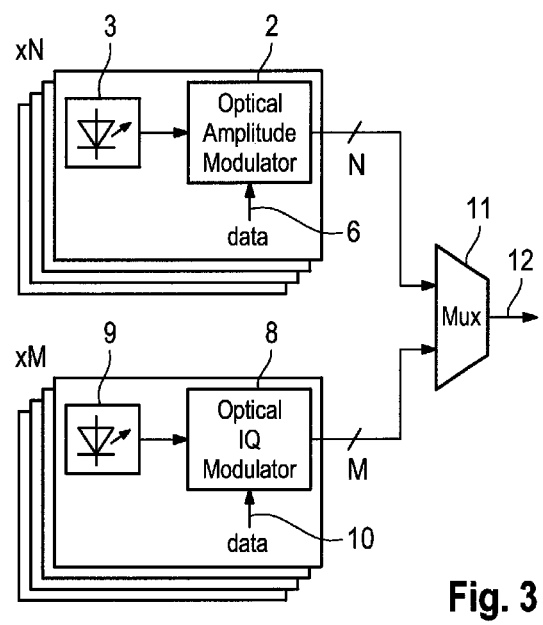
FIG. 3 shows a block diagram for illustrating a further possible embodiment of a transmitter within a hybrid wavelength division multiplexing system according to the present invention.

FIG. 3 shows a block diagram of a further possible implementation of the transceivers 13 as used in a hybrid wavelength division multiplexing system HWDM according to the present invention. In the embodiment shown in FIG. 3 the transceiver arrangement comprises a number N of amplitude modulation transceivers 13A each comprising an optical amplitude modulator 2 and a number M of phase modulation transceivers 13B each comprising an optical phase modulator 8 receiving a light signal to be modulated from a corresponding light source 9. The data signals supplied to the optical phase modulators 8 can be applied to a data input 10 of the transceivers 13. The data signal modulated on the light wave by the optical amplitude modulators 2 can be applied to a data input 6 of the transceivers 13A. The arrangement further comprises a optical multiplexing/demultiplexing unit 11 which is adapted to multiplex the intensity modulated signals received from the N optical amplitude modulators 2 of transceivers 13A and the phase modulated signals received from the M optical phase modulators 8 of the transceivers 13B on the same optical fiber 12 of the hybrid wavelength division multiplexing system HWDM according to the first aspect of the present invention. The transmitter 1 as shown in the embodiments FIG. 2 can be integrated in a transceiver 13A. This transceiver 13A is adapted to transmit and receive an intensity modulated signal by means of an integrated receiver 14. A separate transceiver 13B can be provided which transmits and receives a phase modulated signal.

FIG. 4 shows a block diagram of a hybrid wavelength division multiplexing system HWDM where a transceiver 13A is connected to a remote transceiver 14 via an optical link 15 of an optical network comprising one or several optical fibers such as fiber 12 shown in FIG. 3. The transceiver 13A is adapted to transmit and receive an intensity modulated signal. The transceiver 13A comprises a transmitter 1 as shown in FIG. 2 and a corresponding receiver 14 adapted to receive an intensity modulated signal. Phase modulated signals can be co-propagated through the optical link 15. The system as shown in FIG. 4 can further comprise separate transceivers 13B adapted to transmit and receive phase modulated signals such as a phase modulated 100 G QPSK signals. The system can be composed of many transceivers comprising transceivers 13A for intensity modulated signals and other transceivers 13B for phase modulated signals. The transceivers 13A adapted to transmit and receive intensity modulated signals and the other transmitted 13B provided for transmitting and receiving phase modulated signals can be connected to a multiplexing/demultiplexing unit 11. The transceiver 13A which can be provided for intensity modulated signals such as OOK signals and the other group of transceiver 13B provided for phase modulated signals such as QPSK signals can be on the same shelf or in different shelves at the same location or they can also be in different location. On both sides of the optical link 15 shown in FIG. 4 a multiplexer and a demultiplexer can be provided so that the different intensity modulated signals and the phase modulated signals can travel through the same optical link 15.

The system comprises in the shown embodiment of FIG. 4 a near-end transmitter 1. This near-end transmitter 1 can be formed by a transmitter as shown in the implementation of FIG. 2. The transceiver 13A shown in a possible embodiment has the same structure as the remote transceiver 13A'. The transceiver 13A comprises a near-end transmitter 1 and the remote transceiver 13A' comprises a far-end transmitter 1' as shown in FIG. 4. Those transceivers 13A, 13A' can both comprise a receiver. The transceiver 13A comprises a near-end receiver 14 and the remote transceiver 13A' comprises a far-end receiver 14' as shown in FIG. 4.

The near-end transmitter 1 is adapted to transmit an intensity modulated signal to the far-end receiver 14' of the remote transceiver 13A' via the optical transmission link 15 as shown in FIG. 4. The transceiver 13A further comprises the receiver 14 which is adapted to receive an intensity modulated signal from the far-end transmitter 1' of the remote transceiver 13A' within the hybrid wavelength division multiplexing system HWDM.

In a possible embodiment a transceiver 13A as shown in FIG. 4 can comprise a signal evaluation unit adapted to derive information data of a signal transmission channel through which the intensity modulated signals and the co-propagating phase modulated signals have been transported from the far-end transmitter 1' of the remote transceiver 13A' to the near-end receiver 14 of the transceiver 13A. In a possible implementation the drive voltage of the optical amplitude modulator 2 of the near-end transmitter 1 within the transceiver 13A can be adapted by a drive voltage adaption unit integrated in the transceiver 13A depending on information data derived by the signal evaluation unit of the transceiver 13A.

In an alternative embodiment the signal evaluation unit can also be provided within the remote transceiver 13A' and communicate information data via a separate channel, in particular an optical supervisory channel OSC, to the transceiver 13.

In a possible embodiment the drive voltage adaption unit of the transceiver 13A can provide a control signal for the driver 5 as shown in FIG. 2. In this implementation the output of the drive voltage adaption unit is connected to the control input 7 of the transmitter 1.

Figure 7:
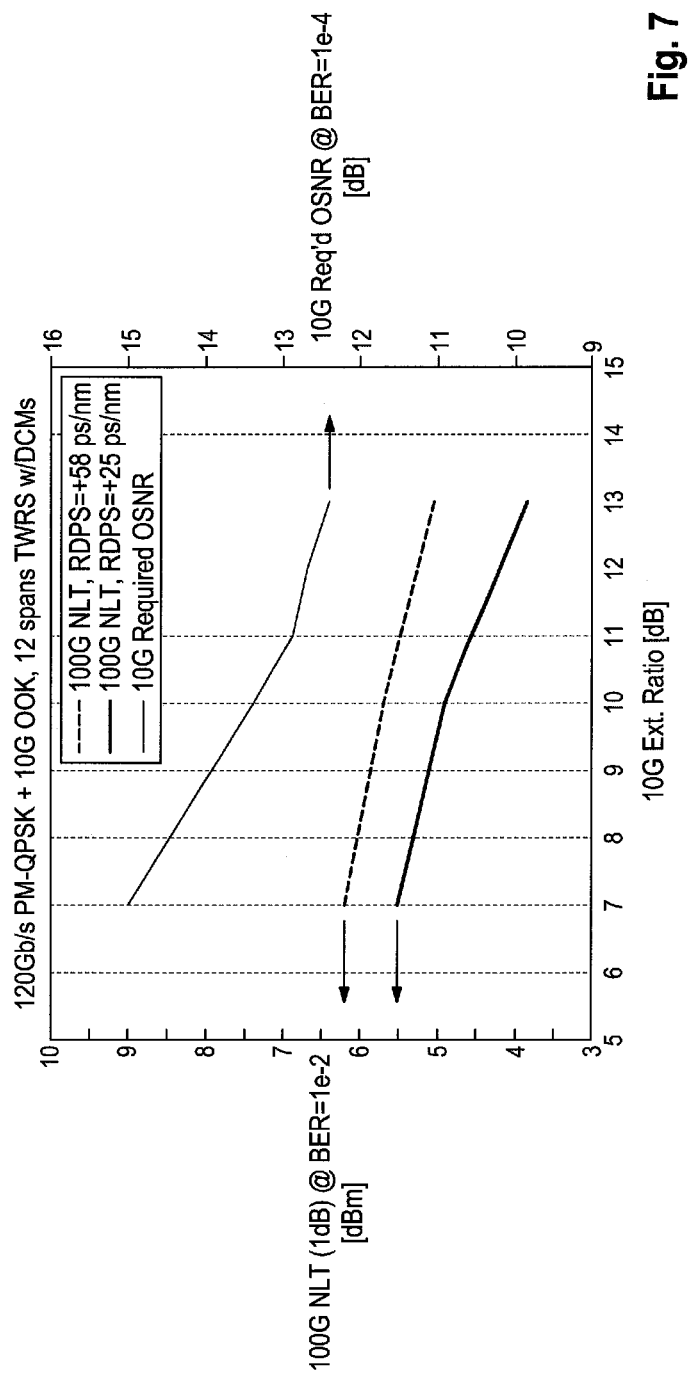
FIG. 7 shows a diagram for illustrating the operation of a possible embodiment of a hybrid wavelength division multiplexing system according to the present invention.

FIG. 7 shows a diagram for illustrating the operation of a hybrid wavelength division multiplexing system according to the first aspect of the present invention. In the shown exemplary implementation a simulated hybrid wavelength division multiplexing system HWDM comprises 12 optical spans of TWRS fiber links with an inline optical dispersion compensation by means of a dispersion compensation fiber DCF for each optical span. The simulations are performed for two cases of residual dispersion per span RDPS corresponding to typical values in a 10 G optical network. The diagram shows two sets of data. The first set of data is the non-linear threshold NLT of the 100 G QPSK phase modulated signal surrounded by 10 G channels. The second set is the required optical signal to noise ratio OSNR of a 10 G OOK amplitude modulated signal nearest to the central 100 G channel. Those values are plotted against the 10 G OOK extinction ratio value which can be varied in the shown implementation between 7 and 13 dB. As can be seen, the reduction of the 10 G OOK extinction ratio causes an increase in the 10 G required OSNR as well as an increase in the 100 G non-linear threshold NLT. The high extinction ratio of e.g. 13 dB corresponds roughly to the extinction ratio of a typical high-quality commercial 10 G OOK module. The lowest extinction ratio value, of e.g. 7 dB, as shown in the diagram, corresponds to a degraded 10 G performance. As can be seen in the diagram at a positive residual dispersion per span RDPS (+58 and +25 ps/nm) the increase of the non-linear threshold NLT of the 100 G channel is not as large as the increase in the required optical signal to noise ratio OSNR for the 10 G OOK channel. However, since the 10 G required OSNR starts off lower than the 100 G QPSK, this scenario still presents an improvement with regard to non-linear threshold NLT as large as 1.6 dB for 100 G while retaining a sufficient operating margin for the 10 G signals. The benefit is even more pronounced at very low residual dispersion per span values (about 0ps/nm) with propagation over higher number of spans or on fiber types with lower chromatic dispersion.

The method and apparatus according to the present provides these benefits with regard to performance in a hybrid wavelength division multiplexing system HWDM in different kinds of modulation formats and data rates, whenever an intensity modulated signal has to be co-propagated with a phase modulated signal which are sensitive to non-linear effects while also having a higher required OSNR as the intensity modulated signals. With the method and apparatus according to the present invention the non-linear tolerance of phase modulated signals operating in a hybrid wavelength division multiplexing system HWDM is significantly improved. The method according to the present invention provides a cross-phase modulation mitigation method which is based on a reduction of the extinction ratio of the amplitude modulated OOK signals. Compared with conventional cross-phase modulation mitigation methods the method according to the present invention can be implemented without additional complexity and does not require any additional hardware in the hybrid wavelength division multiplexing system. The method can be implemented on standard 10 G transponders. It further allows an in-service upgrade and requires in a possible implementation no additional software algorithms. With the method and apparatus according to the present invention the transmission distance of 100 Gb channels in a dense wavelength division multiplexing system DWDM with co-propagating 10 Gb channels can be increased significantly. This is achieved by reducing the cross-phase modulation XPM between the 10 G and 100 G channels which forms the main transmission impairment limiting the transmission distance in a hybrid wavelength division multiplexing network.

In a possible embodiment of the hybrid wavelength division multiplexing system HWDM according to the present invention the performance of the 10 GB/s signals are intentionally degraded by reducing the extinction ratio of the intensity modulated signals to minimize a cross-phase modulation, XPM, impact on the copropagating phase-modulated signals. The degradation of the intensity modulated signal is performed such that an acceptable bit error rate BER is maintained.

Figure 8:
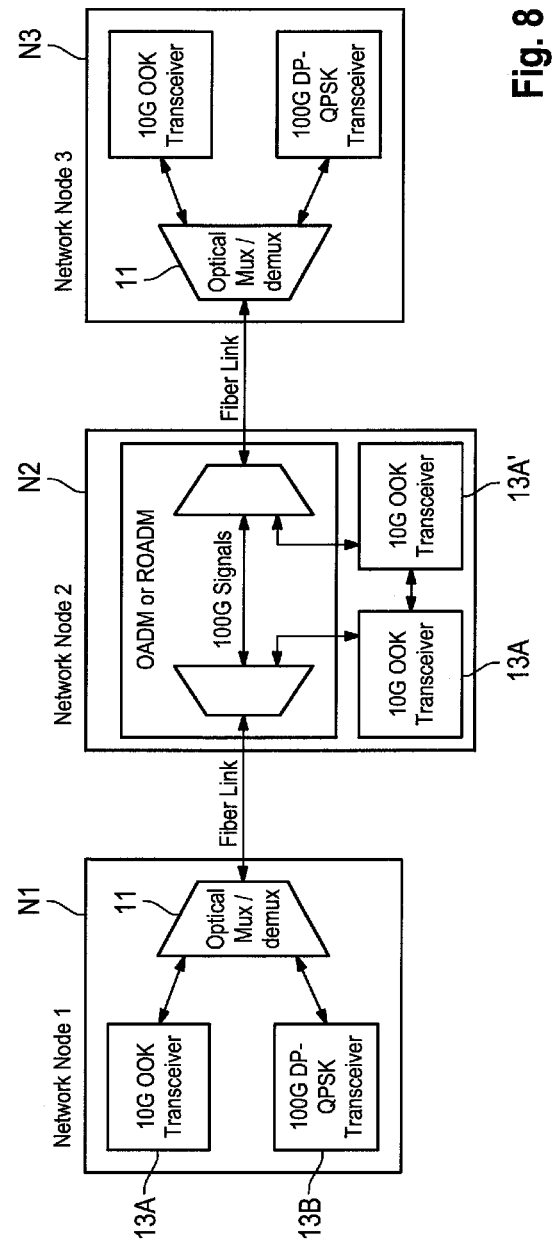
FIG. 8 shows a diagram for illustrating the operation of a further possible embodiment of a hybrid wavelength division multiplexing system according to the present invention.

In a further possible embodiment of the method according to the present invention the performance of the intensity modulated signal such as a 10 GB/s signal is even further degraded so that another pair of 10 G transceivers is to be provided at an intermediate network node as shown in FIG. 8. As illustrated in FIG. 8 an intermediate network node N2 is selected between a first network node N1 and a remote network node N3 by means of fiber links. The network node N2 can be formed by a fixed add-drop multiplexer node or by a reconfigurable optical add-drop multiplexer node ROADM. The intermediate network node N2 can be used for optoelectronic regeneration of the intensity modulated signal such as a 10 G signal. As shown in FIG. 8 the intermediate network node 2 comprises an optical add-drop multiplexer OADM or a reconfigurable optical add-drop multiplexer ROADM connected on both sides by means of multiplexing/demultiplexing units to the fiber links connecting the intermediate network node N2 to the neighboring network nodes N1, N2. In the shown implementation of FIG. 8 the intermediate network node N2 comprises 10 G OOK transceivers 13A' each connected to a corresponding multiplexing/demultiplexing unit and connected to each other by a bidirectional internal link as shown in FIG. 8. The received optical signal received by the optical add-drop multiplexer of node N2 via the fiber link from network node N1 is dropped by the demultiplexer to the connected 10 G OOK transceiver 13A having a long-reach optical receiver and forwarded by the first 10 G OOK transceiver 13A by means of a short-reach optical transmitter and an internal link to a short-reach receiver of the other 10 G OOK transceiver 13A'. From the short receiver of the second 10 G OOK transceiver 13A' the signal is sent by an optical long-reach transmitter of the 10 G OOK transceiver 13A' and a multiplexer via the fiber link to the network node N3. The short reach distance in a DWDM system is in a range of about meters to kilometers whereas a long reach refers to a distance of more than 10 kilometers. The arrangement shown in FIG. 8 is symmetrical and a signal coming from network node N3 can be sent through network node N2 in a similar manner. The implementation shown in FIG. 8 requires additional hardware comprising network node N2 with a signal regenerator. The drawback of the additional hardware required to regenerate the 10 GB signals is however offset by the benefit of avoiding regeneration of 100 Gb/s signals, which carry more capacity. This is achieved by further reducing the cross-phase modulation, XPM, impact of the 10 GB/s intensity modulated signals to the QPSK phase-modulated 100 GB/s channels, thus allowing the 100 GB/s to operate without regeneration.

FIGS. 9A, 9B show a situation with a margin for a further reduced 10 G extinction ratio. In this case the OSNR margin for the 10 G signal is so low that it must be regenerated, for example by an intermediate network node N2 as shown in the embodiment of FIG. 8.

What is claimed is:

1. A hybrid wavelength division multiplexing system, wherein one or more intensity modulated signals is co-propagated with one or more phase modulated signals, said one or more phase modulated signals is propagated on different wavelengths than the one or more intensity modulated signals, and
wherein an extinction ratio of the one or more intensity modulated signals is reduced to minimize a cross-phase modulation impact on the co-propagating one or more phase modulated signals.

2. The hybrid wavelength division multiplexing system according to claim 1 wherein the intensity modulated signal is generated by an optical amplitude modulator comprising a Mach-Zehnder modulator receiving an adapted drive voltage to modulate the intensity of an optical signal generated by a light source.

3. The hybrid wavelength division multiplexing system according to claim 2 wherein said optical amplitude modulator is integrated in a transmitter of a transceiver within said hybrid wavelength division multiplexing system.

4. The hybrid wavelength division multiplexing system according to claim 3 wherein the drive voltage is output by a driver of said transmitter in response to a data signal received from a data source connected to said transceiver.

5. The hybrid wavelength division multiplexing system according to claim 3 wherein the drive voltage is preconfigured, set by an algorithm, or set dynamically in response to information data obtained by a receiver of a remote transceiver within said hybrid wavelength division multiplexing system and communicated to said transmitter of said near end transceiver within said hybrid wavelength division multiplexing system via an optical supervisory channel (OSC).

6. The hybrid wavelength division multiplexing system according to claim 2 wherein said optical amplitude modulator is adapted to generate a 10 Gbit/sec On/Off keying (OOK) amplitude modulated signal.

7. The hybrid wavelength division multiplexing system according to claim 2 wherein said co-propagated phase modulated signals is a 100 Gbit/sec PDM-QPSK signal.

8. The hybrid wavelength division multiplexing system according to claim 1 wherein said hybrid wavelength division multiplexing system is a dense WDM system.

9. The hybrid wavelength division multiplexing system according to claim 3, wherein said transceiver is connected to a multiplexer which is adapted to multiplex the intensity modulated signal and other intensity or phase modulated signals on a different wavelength than a wavelength on which the intensity modulated signal is modulated on the same optical fiber of the hybrid wavelength division multiplexing system.

10. A transmitter for a hybrid wavelength division multiplexing system, said transmitter comprising:
an optical amplitude modulator receiving a drive voltage and being adapted to reduce an extinction ratio of an intensity modulated signal generated by said optical amplitude modulator in response to the drive voltage to minimize a cross-phase modulation impact of the intensity modulated signal generated by said optical amplitude modulator on phase modulated signals co-propagated in said hybrid wavelength division multiplexing system along with the generated intensity modulated signal,
said phase modulated signals being propagated on different wavelengths than the intensity modulated signal.

11. The transmitter according to claim 10, wherein said optical amplitude modulator is a Mach-Zehnder modulator.

12. A transceiver for a hybrid wavelength division multiplexing system, the transceiver comprising a near-end transmitter according to claim 10 adapted to transmit an intensity modulated signal to a far-end receiver of a remote transceiver within said hybrid wavelength division multiplexing system, the transceiver further comprising a receiver adapted to receive an intensity modulated signal from a far-end transmitter of said remote transceiver within said hybrid wavelength division multiplexing system.

13. The transceiver according to claim 12, further comprising a signal evaluation unit adapted to derive information data of a signal transmission channel through which the intensity modulated signal has been transported from the far-end transmitter of the remote transceiver to the near-end receiver of said transceiver.

14. The transceiver according to claim 12 wherein said drive voltage of said optical amplitude modulator of said near-end transmitter within the transceiver is adapted by a drive voltage adaption unit of said transceiver depending on information data derived by a signal evaluation unit of said transceiver.

15. A method for increasing a transmission performance of a hybrid wavelength division multiplexing system where an intensity modulated signal is co-propagated with one or more phase modulated signals,
wherein an extinction ratio of the intensity modulated signal is reduced to minimize a cross-phase modulation impact on said co-propagating phase modulated signals, and
wherein said one or more phase modulated signals being propagated on different wavelengths than the intensity modulated signal.

16. The method according to claim 15 wherein a drive voltage of an optical amplitude modulator of a near-end transmitter is modified to reduce the extinction ratio of the intensity modulated signal generated by said optical amplitude modulator.

17. The method according to claim 16 wherein the drive voltage of the optical amplitude modulator is preconfigured, set by an algorithm, or set dynamically in response to information data obtained by a far-end receiver of a remote transceiver and communicated to the near-end transmitter comprising said optical amplitude modulator via an optical supervisory channel (OSC).

18. The system of claim 1, wherein the extinction ratio of the one or more intensity modulated signals is reduced in such a manner so as to reduce the OSNR margin of the one or more intensity modulated signals and to increase the OSNR margin of the one or more co-propagating phase modulated signals, wherein the OSNR margin is the difference between the actual OSNR of the signals at the optical link after propagating through a sequence of fiber span amplifiers and other components and the OSNR required by the receiver for a given BER.

19. The system of claim 18, wherein the OSNR margin of the one or more intensity modulated signals is decreased and the OSNR margin of the one or more co-propagating phase modulated signals is increased such that they are the same.

20. The transmitter of claim 10, wherein the extinction ratio of the one or more intensity modulated signals is reduced in such a manner so as to reduce the OSNR margin of the one or more intensity modulated signals and to increase the OSNR margin of the one or more co-propagating phase modulated signals, wherein the OSNR margin is the difference between the actual OSNR of the signals at the optical link after propagating through a sequence of fiber span amplifiers and other components and the OSNR required by the receiver for a given BER.

21. The transmitter of claim 20, wherein the OSNR margin of the one or more intensity modulated signals is decreased and the OSNR margin of the one or more co-propagating phase modulated signals is increased such that they are the same.

22. The method of claim 15, wherein the extinction ratio of the one or more intensity modulated signals is reduced in such a manner so as to reduce the OSNR margin of the one or more intensity modulated signals and to increase the OSNR margin of the one or more co-propagating phase modulated signals, wherein the OSNR margin is the difference between the actual OSNR of the signals at the optical link after propagating through a sequence of fiber span amplifiers and other components and the OSNR required by the receiver for a given BER.

23. The method of claim 22, wherein the OSNR margin of the one or more intensity modulated signals is decreased and the OSNR margin of the one or more co-propagating phase modulated signals is increased such that they are the same.

* * * * *